United States Patent [19]
Kimball

[11] Patent Number: 5,881,053
[45] Date of Patent: *Mar. 9, 1999

[54] METHOD FOR A WIRELESS COMMUNICATIONS CHANNEL

[75] Inventor: Robert H. Kimball, San Diego, Calif.

[73] Assignee: Qualcomm Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 718,039

[22] Filed: Sep. 13, 1996

[51] Int. Cl.⁶ .................................................. H04L 12/18
[52] U.S. Cl. ........................................... 370/260; 370/335
[58] Field of Search ........................... 370/252, 260–263, 370/320, 335, 342, 468, 267, 477; 379/202, 203, 206; 375/200, 225; 455/416

[56] References Cited

U.S. PATENT DOCUMENTS

| | | | |
|---|---|---|---|
| 4,573,207 | 2/1986 | Smith et al. | 455/54 |
| 5,179,572 | 1/1993 | Schilling | 375/200 |
| 5,210,794 | 5/1993 | Brunsgard | 370/264 |
| 5,263,045 | 11/1993 | Schilling | 375/200 |
| 5,272,698 | 12/1993 | Champion | 370/260 |
| 5,414,796 | 5/1995 | Jacobs et al. | 395/2.3 |
| 5,436,896 | 7/1995 | Anderson et al. | 370/260 |
| 5,568,483 | 10/1996 | Padovani et al. | 370/468 |
| 5,610,906 | 3/1997 | Schilling | 370/261 |

FOREIGN PATENT DOCUMENTS

| 9307723 | 4/1993 | WIPO . |
|---|---|---|
| 9508888 | 3/1995 | WIPO . |

OTHER PUBLICATIONS

Munier, et al. "Conference Circuit for a Digital Switching System" IBM Technical Disclosure Bulletin 26(11): 5813–5816 (Apr. 1984).

Primary Examiner—Chau Nguyen
Attorney, Agent, or Firm—Russell B. Miller; Bruce W. Greenhaus; Kent D. Baker

[57] ABSTRACT

A conference calling system for a wireless communications channel. The system is adapted for use with a channel having first, second and third participants communicating via first, second and third transmitters and receivers respectively. The system includes a circuit for receiving an encoded signal from at least one of the transmitters. A second circuit determines which of the participants is speaking from the received encoded signal. A third circuit is provided for re-transmitting an encoded signal received from the speaking participant to the other participants. In the illustrative implementation, the encoded signals are variable rate speech vocoded signals in which speech is vocoded at full rate, silence is vocoded at ⅛th rate and the ½ and ¼ rates are used as transitional rates. In the illustrative implementation, the speaker's signal is identified by examining the rate of the received vocoded signals. When the speaker's vocoded signal is identified, it is re-transmitted without de-vocoding to the non-speaking participants in the conference call. By re-transmitting the speaker's signal without de-vocoding, the quality of the received signal is preserved.

9 Claims, 4 Drawing Sheets

METHOD FOR A WIRELESS COMMUNICATIONS CHANNEL

BACKGROUND OF THE INVENTION

1. Field of the Invention

The present invention relates to communications systems. More specifically, the present invention relates to systems and techniques for providing conference calling in digital telephone systems.

2. Description of the Related Art

Generally, communications systems transmit voice, video and/or data from one point to another. In certain applications, it is desirable to communicate between multiple points. In a voice context, this is achieved by 'conference calling'. Conference calling allows each of a plurality of spatially separated participants to communicate contemporaneously with each other as though present in a shared environment.

In a conventional (land line) telephone system, voice quality for conference calls is maintained through the use of switches and amplifiers which sum and distribute the speech of those speaking to the participants in the conference call.

However, in digital wireless communication systems such as cellular telephone systems, conference calling is somewhat more problematic. This is due to the fact that speech in these systems is generally compressed at some point in transmission. Conference calling in this context conventionally requires decompression of compressed speech so that the signals may be summed as analog signals prior to any re-transmission to conference participants. This is due to the cost and complexity associated with digital signal summing schemes. Unfortunately, the compression, decompression, recompression and re-decompression of speech significantly degrades the quality thereof at the receiver. An excellent illustration of this problem may be found in a CDMA conference bridging system.

CDMA (Code Division Multiple Access) modulation is one of several techniques for facilitating communications in which a large number of system users are present. CDMA offers several advantages over other techniques known in the art such as TDMA (Time Division Multiple Access), FDMA (Frequency Division Multiple Access), and AM (Amplitude Modulation) schemes such as ACSSB (Amplitude Companded Single Sideband). The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", the teachings of which are incorporated herein by reference. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", the teachings of which are also incorporated herein by reference.

CDMA systems often employ a variable rate vocoder to encode data so that the data rate can be varied from one data frame to another. An exemplary embodiment of a variable rate vocoder is described in U.S. Pat. No. 5,414,796, entitled "VARIABLE RATE VOCODER", the teachings of which are incorporated herein by reference. The use of a variable rate communications channel reduces mutual interference by eliminating unnecessary transmissions when there is no useful speech to be transmitted. Algorithms are utilized within the vocoder for generating a varying number of information bits in each frame in accordance with variations in speech activity. For example, a vocoder with a rate set comprising four rates may provide 20 millisecond data frames containing 20, 40, 80, or 160 bits, depending on the activity of the speaker. It is desired to transmit each data frame in a fixed amount of time by varying the transmission rate of communication. Additional details on the formatting of the vocoder data into data frames are described in U.S. Pat. No. 5,511,073, entitled "METHOD AND APPARATUS FOR THE FORMATTING OF DATA FOR TRANSMISSION", the teachings of which are incorporated herein by reference.

In a conventional CDMA conference bridging arrangement, the speech signals received from each of the participants are devocoded, summed then revocoded and re-transmitted to the participants. Devocoding involves detecting the rate of the received vocoded signal and decoding it accordingly. One technique for determining the rate of a received frame of vocoded data is disclosed and claimed in copending U.S. patent application Ser. No. 08/233,570, filed Apr. 26, 1994, U.S. Pat. No. 5,566,206, and entitled "METHOD AND APPARATUS FOR DETERMINING DATA RATE OF TRANSMITTED VARIABLE RATE DATA IN A COMMUNICATIONS RECEIVER", and U.S. patent application Ser. No. 08/126,477, entitled "MULTI-RATE SERIAL VITERBI DECODER FOR CODE DIVISION MULTIPLE ACCESS SYSTEM APPLICATIONS", filed Sep. 24, 1993, abandoned, the teachings of both of which are incorporated herein by reference. According to these techniques, each received data frame is decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates all of which are well-known in the art. A processor analyzes the error metrics and determines the most probable rate at which the incoming symbols were transmitted. This rate is used to decode the received signal.

In a conference bridging arrangement, the speech and/or background noise from each conference participant is vocoded and transmitted to a base station by a transmitter at each subscriber station. At the base station, the vocoded signals are received, devocoded, summed, revocoded and re-transmitted to the conference participants. At each subscriber location, the revocoded signals are re-devocoded. As mentioned above, this vocoding, devocoding, revocoding and re-devocoding severely degrades the quality of the received signals.

Hence there is a need in the art for a system and/or technique for maintaining voice quality in wireless digital conference calling systems.

SUMMARY OF THE INVENTION

The need in the art is addressed by the present invention which provides a conference calling system for a wireless communications channel. The invention is adapted for use with a channel having first, second and third participants communicating via first, second and third transmitters and receivers respectively. The inventive system includes a circuit for receiving an encoded signal from at least one of the transmitters. A second circuit determines which of the participants is speaking from the received encoded signal. A third circuit is provided for re-transmitting an encoded signal received from the speaking participant to the other participants. It should be noted that the exemplary embodiment for providing conference calling to three participants can easily be generalized to any number of participants and can include land-line participants.

In an illustrative implementation, the encoded signals are variable rate speech vocoded signals in which speech is vocoded at full rate, silence is vocoded at ⅛th rate and the ½ and ¼ rates are used as transitional rates. In the illustrative implementation, the contents of the speaker's signal is identified by examining the rate of the received vocoded signals. When the speaker's vocoded signal is identified, it is re-transmitted without devocoding to the non-speaking participants in the conference call.

By re-transmitting the speaker's signal without de-vocoding, the quality of the received signal is preserved.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
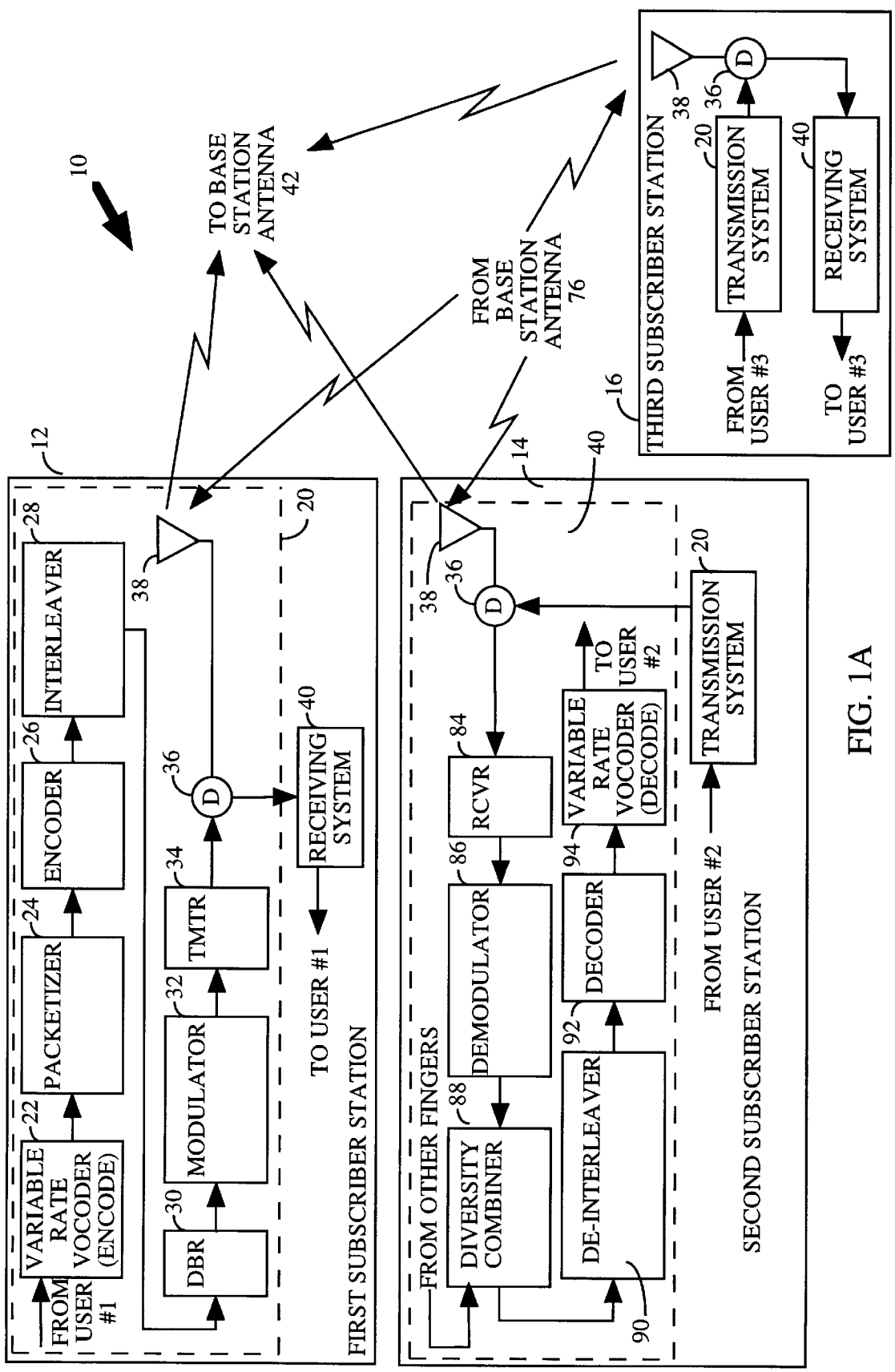
FIG. 1 is a block diagram of the conference calling system of the present invention.
Figure 1B:
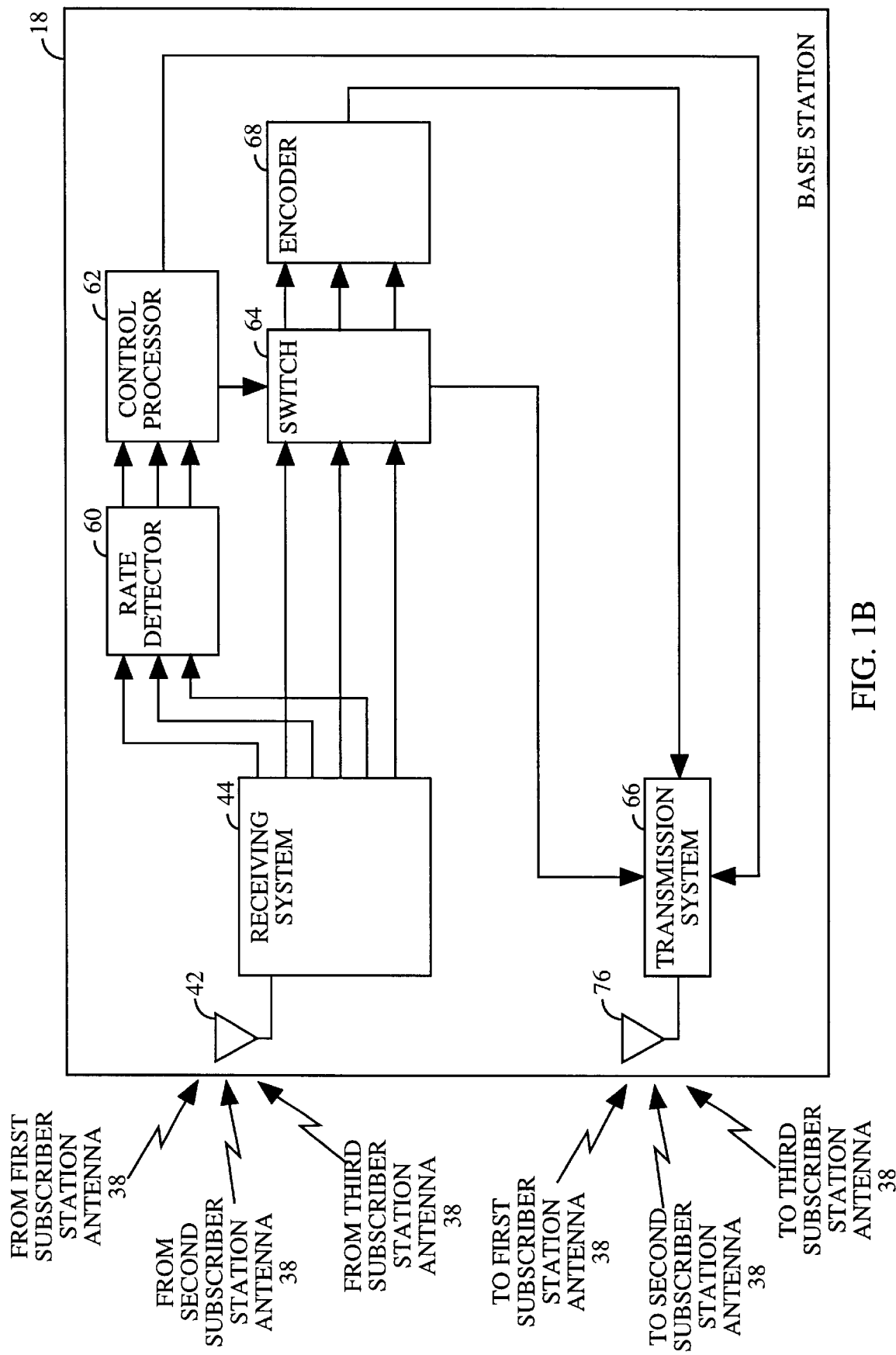

FIG. 1 is a block diagram of the conference calling system of the present invention. The system 10 includes first, second and third subscriber stations 12, 14 and 16, respectively, which communicate with a base station 18. (Those skilled in the art will appreciate that the invention is not limited to the number of subscriber stations shown.) In the exemplary embodiment, each of the subscriber stations includes an identical transmitter system 20 and a receiver system 40. In the illustrative embodiment, the user of the first subscriber station 12 is speaking and the users of the second and third stations (14 and 16) are listening. The transmitter system 20 is illustrated in FIG. 1 with respect to the first subscriber station 12. Speech data frames from s the user of the first subscriber station 12 are provided to a variable rate vocoder 22. In the exemplary embodiment, the variable rate vocoder 22 is implemented in the manner described in U.S. Pat. No. 5,414,796, the teachings of which have been incorporated herein by reference. The vocoder 22 processes the input speech data frame to provide a vocoded frame. The vocoder 22 provides frames of speech coded data at four different rates, referred to as full rate, half rate, quarter rate and eighth rate. A half rate packet contains approximately half the number of bits as a full rate packet, a quarter rate packet contains approximately one quarter the number of bits as a full rate packet and an eighth rate packet contains approximately one eighth the number of bits of a full rate packet.

The vocoded frame is then provided to a packetizer 24 which, in the illustrative embodiment, generates a set of cyclic redundancy check (CRC) bits for the frame and appends the CRC bits and a set of tail bits to the frame. In the illustrative embodiment, the packetizer 24 operates in accordance with the Telecommunications Industry Association's standard *TIA/EIA/IS95-A Mobile Station-Base Station Compatibility for Dual Mode Wideband Spread Spectrum Cellular System.*

The frame from the packetizer 24 is then provided to an encoder 26. The encoder 26 encodes the speech for error detection and correction. In the exemplary embodiment, the encoder 26 is a convolutional encoder, the design and implementation of which is well known in the art. The frame of encoded symbols is then provided to an interleaver 28.

The interleaver 28 reorders the encoded symbols of the frame in accordance with a predetermined reordering format. In the illustrative embodiment, for packets of less than full rate, the interleaver 28 generates duplicates of the reordered symbols in the packets to provide packets of a constant data rate. When the variable rate packet is half rate, the interleaver 28 introduces a factor of two redundancy, i.e., each symbol is repeated twice within the output packet. When the variable rate packet is quarter rate, the interleaver 28 introduces a factor of four redundancy. When the variable rate packet is eighth rate, the interleaver 28 introduces a factor of eight redundancy.

The packets are then provided to a data burst randomizer (DBR) 30. The data burst randomizer 30 removes the redundancy from the packets in accordance with a pseudo-random process as described in U.S. Pat. No. 5,535,239, the teachings of which are incorporated herein by reference. The data burst randomizer 30 selects one copy of the interleaved data symbols for transmission in accordance with a pseudo-random selection process and gates the other redundant copies of those symbols.

The selectively gated frame is then provided to a modulator 32 which modulates the frame for transmission. In the illustrative embodiment, the modulator 32 is a spread spectrum modulator as described in detail in the aforementioned U.S. Pat. Nos. 4,901,307 and 5,103,459, the teachings of which have been incorporated herein by reference. The modulated frame is then provided to an RF transmitter (TMTR) 34. The transmitter 34 upconverts and amplifies the signal for transmission through a duplexer 36 to an antenna 38.

The signal is transmitted by the first subscriber station 12 and received by the base station 18. In accordance with the present teachings, the signal received by the base station 18 is transmitted to the second and third subscriber stations 14 and 16, respectively, without devocoding if it is transmitted as a full rate speech signal.

Figure 2:
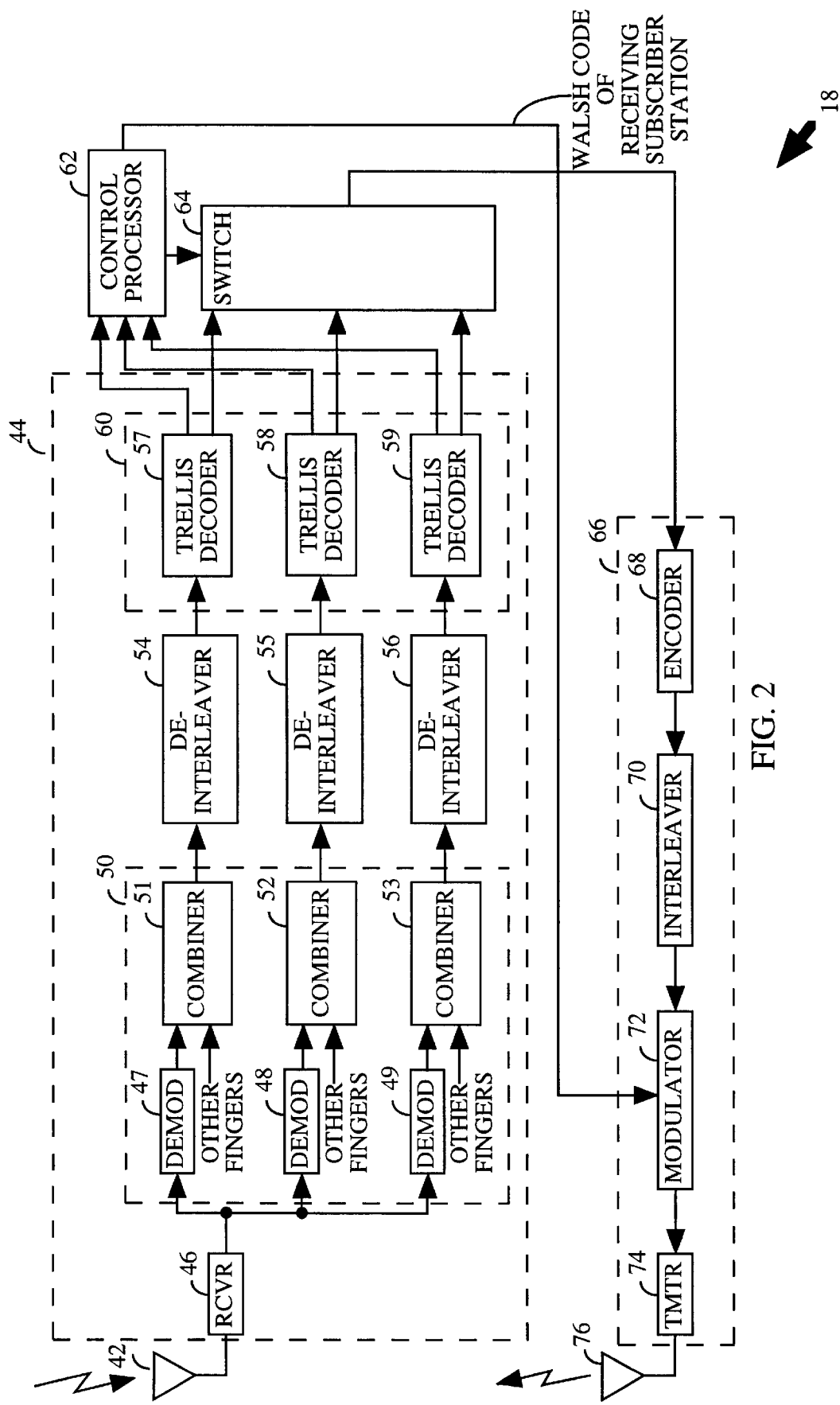
FIG. 2 is a block diagram illustrating the components of the base station of the conference calling system of the present invention.

FIG. 2 is a block diagram of the base station of the conference calling system of the present invention. As illustrated in FIG. 2, the signal is received by an antenna 42 of the base station and provided thereby to a receiver system 44 which processes the received signal. The receiver system 44 includes an RF receiver 46 which downconverts the received signals. The base station 18 does not know a priori which of the subscriber station users will be actively talking and which will be listening. Thus, the receiver 46 processes data frames received from the subscriber stations 12, 14 and 16 and passes the processed signals to first, second and third demodulators 47, 48 and 49, respectively, of multiple access receive subsystem 50. The demodulators 47, 48 and 49 demodulate the downconverted signals in accordance with the modulation scheme of the modulator 32 of the transmitter section 20 of the corresponding subscriber station. In the illustrative embodiment, the demodulators 47, 48 and 49 are CDMA demodulators as described in detail in the aforementioned U.S. Pat. Nos. 4,901,307 and 5,103,459.

The multiple access receive subsystem 50 further includes first, second and third combiners 51, 52 and 53, respectively, which receive input from the first, second and third demodulators 47, 48 and 49, respectively. The demodulated signal from the demodulators 47, 48 and 49 and other demodulators (not shown) which demodulate the same signal which traveled through different propagation paths to the base station 18 are shown as "Other Fingers" and provided to the associated diversity combiners 51, 52 or 53.

CDMA, by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", the teachings of which are incorporated herein by reference.

The diversity combiners 51, 52 and 53 combine the signals to provide an improved estimate of the demodulated signal. In the illustrative embodiment, the diversity combiners 51, 52 and 53 are designed and constructed in accordance with the teachings of the above-reference U.S. Pat. No. 5,109,390, the teachings of which have been incorporated herein by reference.

The output of the first, second and third combiners 51, 52 and 53 is provided to first, second and third de-interleavers 54, 55, and 56, respectively. The de-interleavers re-order the demodulated symbols data in accordance with the predetermined re-ordering format as set by the interleaver 28 of each transmitter section 20 of each subscriber station.

The frames from the first, second and third de-interleavers 54, 55, and 56, respectively, are then provided to first, second and third decoders 57, 58 and 59, respectively, which decode the data. In the illustrative embodiment, the first, second and third decoders 57, 58 and 59 are multi-rate trellis decoders as described in detail in the aforementioned U.S. patent application Ser. No. 08/126,477.

In the illustrative embodiment, the receiver system 44 determines the rate of the received frame as an artifact of the decoding process which is performed, in the illustrative embodiment, by the multi-rate trellis decoders. Hence, a rate detector 60 is shown in the drawings as being provided by the trellis decoders 57, 58 and 59. The rate detector 60 determines an estimate of the rate of the signals sent by each of the subscriber stations. In an alternative embodiment, the rate detector can be a separate processor which estimates the rate of the received signal based on the energy of the received frame or on the energy of the received frame normalized by the energy of a pilot signal or by looking at gaps in the incoming signal or by a simple algorithm based on which of the users was speaking last.

The rate estimates are provided to a control processor 62. In the first example, the rate detector 60 provides a signal to the control processor 62 which indicates that the frame from the first subscriber station 12 was of a rate higher than the frames from the second and third subscriber stations 14 and 16. For example, the frame from the first subscriber station 12 may be a full rate frame and the frames from second and third subscriber stations 14 and 16 may be eighth rate frames, indicating that the user of the first station 12 is speaking and the users of the second and third stations 14 and 16 are listening. In response to this signal, the control processor 62 sends a signal to a switch 64 and a transmission system 66 which indicates that the signal from the first subscriber station 12 is to be sent to the second and third subscriber stations 14 and 16. The switch 64 then provides the trellis decoded signal received from the subscriber station having the highest rate frame (the first subscriber station 12 in the illustrative example) to an encoder 68 of the transmission system 66. Note that a significant feature of the present teachings is that the signal packet received at the highest rate is not speech (vocode) decoded. This eliminates the steps of devocoding the speech to analog, summing with other received signals, then revocoding prior to re-transmission thereby providing significant improvements in the quality of the speech signal received by the other stations in the conference.

The encoder 68 encodes the speech signal received from the switch 64 for error detection and correction. In the exemplary embodiment, the encoder 68 is a convolutional encoder, the design and implementation of which is well known in the art. The frame of encoded symbols is then provided to an interleaver 70.

The interleaver 70 reorders the encoded symbols of the frame in accordance with the reordering format as described above with respect to the interleaver 28 of the transmitter 20 of each base station. The output of the interleaver 70 is provided to a modulator 72.

The modulator 72 may be implemented in the same manner as the modulator 32 of the transmitter section 20 described above. The modulator 72 receives a 'subscriber select' signal via a Walsh code from the control processor 62. In response to the subscriber select signal, the modulator 72 modulates the interleaved encoded signal to be received by the second and third subscriber stations 14 and 16 for the illustrative example of the user of the first subscriber station 12 (User #1) speaking. Walsh codes are known in the art. See for example, above-referenced U.S. Pat. No. 5,103,459, the teachings of which have been incorporated herein by reference.

The output of the modulator 72 is input to a transmitter 74. The transmitter 74 is an RF transmitter such as the transmitter 34 of FIG. 1. The output of the transmitter 74 is provided to an antenna 76 for transmission to the second and third subscriber stations 14 and 16.

In the event that there is a tie for the rate of the highest rate frame, switch 64 provides the decoded packet of the speaker that has tied for highest rate who was speaking last. For example, if the frames from first subscriber station 12 and second subscriber station 14 were both full rate frames. Then, control processor 62 would select the frame of the speaker who was last speaking and provide a signal to switch 64 indicating the selection. The output of the switch 64 is provided to the encoder 68 of the transmission system 66 and transmitted to the subscriber stations 12, 14 and 16 in the manner set forth above.

Returning to FIG. 1, the signal transmitted by the base station 18 is received by the second and third subscriber stations 14 and 16, respectively. Although receipt by the second station 14 is described in detail, it is understood that the design, construction and operation of the receiver sections of the first and third stations 12 and 16, respectively, with respect to the signal transmitted by the base station 18 is identical to that of the second station 14.

The signal transmitted by the base station 18 is received by the second subscriber station 14 by an antenna 38 and provided through a duplexer 36 to a receiver (RCVR) 84. The receiver 84 downconverts and amplifies the received signal and provides it to a demodulator 86. The demodulator 86 demodulates the received signal in accordance with modulation format of the modulator 72 of the base station 18. In the illustrative embodiment, the demodulator 86 is a CDMA demodulator as described in detail in the aforementioned U.S. Pat. Nos. 4,901,307 and 5,103,459.

The diversity combiner 88 is implemented in the same manner as the combiners 51, 52 and 53 of the base station 18 as described above and as disclosed by the above-reference U.S. Pat. No. 5,109,390, the teachings of which have been incorporated herein by reference.

The demodulated signal from the diversity combiner 88 is provided to a de-interleaver 90. The de-interleaver 90 re-orders the demodulated symbol data in accordance with a predetermined re-ordering format as set by the interleaver 70 of the base station 18.

The frame from the de-interleaver 90 is then provided to a decoder 92 which decodes the data. In the illustrative embodiment, the decoder 92 is a multi-rate trellis decoder as described in detail in the aforementioned U.S. patent application Ser. No. 08/126,477. The decoded data is then provided to a variable rate vocoder 94. The variable rate vocoder 94 reconstructs the speech data from the decoded bit data and provides it to the user of the second subscriber station 14 (User #2).

The third subscriber station is not described in detail as the transmitter section of each station is as described above with respect to that of the first subscriber station 12 and the receiver section of each station is as described above with respect to the second subscriber station 14.

Figure 3:
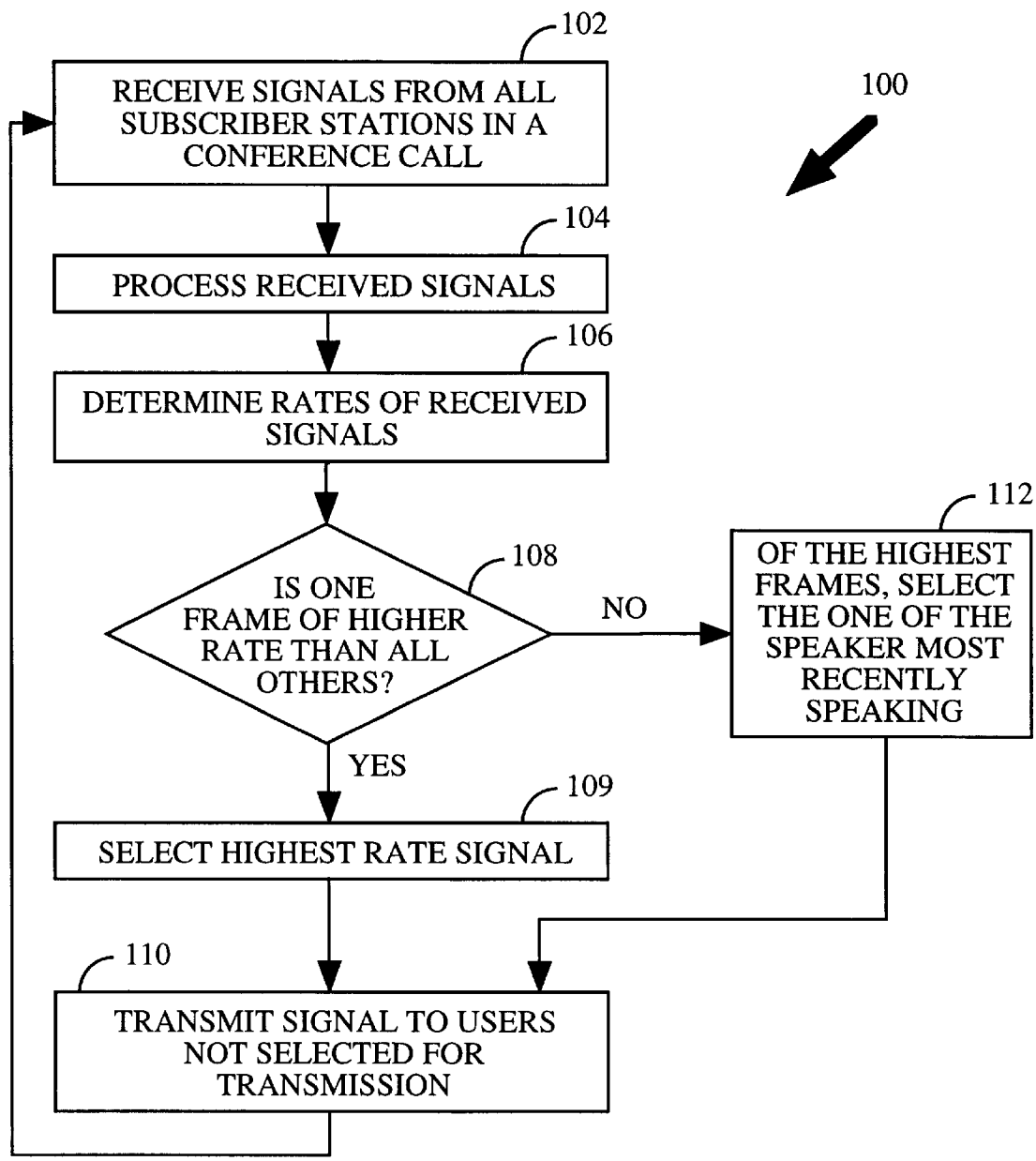
FIG. 3 is a flow diagram illustrating the method of providing conference calling services in a wireless environment in accordance with the teachings of the present invention.

FIG. 3 is a flow diagram 100 illustrating a method of providing conference calling services in a wireless environment in accordance with the teachings of the present invention. As illustrated in FIG. 3, at step 102, the base station 18 receives signals from all subscriber stations in a conference call. At step 104, the received signals are processed and, at step 106, the rates of the received signals are determined. At step 108, the control processor 62 checks to determine whether the rate of one of the frames is higher than the other two frames. If yes, then at steps 109 and 110, the highest rate frame is selected for transmission to the subscriber stations not selected for transmission.

As mentioned above, this is a significant feature of the present invention in that the signal packet received at full rate is not speech (vocode) decoded. This eliminates the steps of devocoding the speech to analog, summing with other received signals, then revocoding prior to re-transmission thereby providing significant improvements in the quality of the speech signal received by the other stations in the conference.

If there is a tie between the highest rate frames, the control processor 62 selects the tied highest rate frame belonging to the subscriber station which has spoken most recently in block 112 and is transmitted as described previously in block 110.

Figure 4:
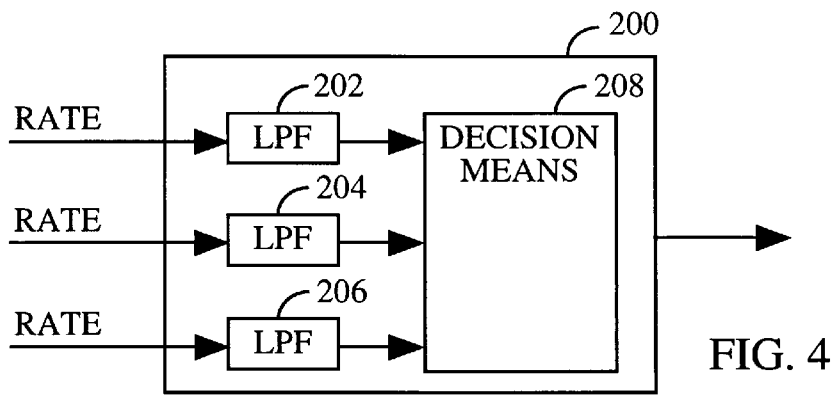
FIG. 4 is a block diagram of the control processor.

FIG. 4 illustrates an improved implementation of the control processor of the present invention. Control processor 200 could be substituted for control processor 62 of FIG. 2. In control processor 200 the rates of the frames determined by the decoder are filtered by low pass filters 202, 204 and 206. This prevents switch 64 from switching unnecessarily. For example if one speaker pauses momentarily in his discourse and during that pause a second speaker moves his chair, then without this filtering the switch would result in the undesirable transmission switching from the first speaker to the second speaker, followed by a switching back to the first speaker when he resumes his discourse. Low pass filters 202, 204 and 206 can be implemented by methods that are well known in the art.

The filtered rates from low pass filters 202, 204 and 206 are provided to decision means 208 which operates as described in FIG. 3 except the decision is based on the filtered rate and not on the current rate alone.

Thus, the present invention has been described herein with reference to a particular embodiment for a particular application. Those having ordinary skill in the art and access to the present teachings will recognize additional modifications applications and embodiments within the scope thereof. It is therefore intended by the appended claims to cover any and all such applications, modifications and embodiments within the scope of the present invention.

We claim:

1. A conference calling system for a wireless communications channel having first, second and third participants communicating via first, second and third transmitters and receivers respectively, said conference calling system comprising:

means for receiving variable rate vocoded signals each having a rate from at least one of said transmitters;

means for determining said rate of each received vocoded signal;

means for selecting only one of said received vocoded signals based upon the rate of each received vocoded signal; and means for re-transmitting the selected received vocoded signal to the other participants.

2. The conference calling system of claim 1 wherein said variable rate vocoded signals have speech vocoded at a first rate and silence vocoded at a second rate.

3. A conference calling system for a CDMA communications channel having first, second and third participants communicating via first, second and third transmitters and receivers respectively, wherein one of said participants is speaking and said conference calling system comprising:

means for receiving variable rate vocoded signals from each of said transmitters;

means for determining which of said participants is speaking by determining a rate of encoding of each of said vocoded signals; and means for re-transmitting the vocoded signal received from the speaking participant to the other participants, said means for re-transmitting including:

switch means for selecting for re-transmission between first, second and third receivers adapted to receive signals transmitted by said first, second and third participant transmitters respectively; and control means for activating said switch means in response to the output of said means for determining the rate of each vocoded signal.

4. A conference calling method for a wireless communications channel having first, second and third participants communicating via first, second and third transmitters and receivers respectively, wherein one of said participants is speaking and said conference calling method including the steps of:

receiving variable rate vocoded signals each having a rate from at least one of said transmitters;

determining the rate of each of said received vocoded signals;

selecting only one of said received vocoded signals based upon the rates; and re-transmitting the selected received vocoded signal to the other participants.

5. A conference calling system having first, second and third participants communicating via first, second and third transmitters and receivers respectively, comprising:

a receiver which receives variable rate vocoded signals from at least one of the transmitters, each received signal having a rate;

a rate determination circuit which determines the rate of each of the received vocoded signals;

a switch for selecting only one of the received vocoded signals based on the rates determined by the rate determination circuit; and a transmitter which re-transmits to the other participants, the selected one of the received vocoded signals.

6. The system of claim 5 wherein the variable rate vocoded signals have speech vocoded at a first rate and silence vocoded at a second rate.

7. A conference calling system for a CDMA communications channel having first, second and third participants communicating via first, second and third transmitters and receivers respectively, comprising:

a receiver which receives variable rate vocoded signals from each of the transmitters;

a rate determination circuit that determines which of said participants is speaking by determining a rate of encoding of each of the vocoded signals;

a transmitter which re-transmits to the other participants, the vocoded signal received;

a switch, coupled to the first, second and third receivers, adapted to receive signals transmitted by the first, second and third participant transmitters, respectively; and control means for activating said switch in response to the output of said rate determination circuit.

8. A conference calling system for a wireless communications channel having first, second and third participants communicating via first, second and third transmitters and receivers respectively, wherein one of said participants is speaking and said conference calling system comprising:

means for receiving variable rate vocoded signals from at least one of said transmitters, said vocoded signals have speech vocoded at a first rate and silence vocoded at a second rate;

means for determining which of said participants is speaking from said received vocoded signals by determining the rate of each vocoded signal and providing an output in response thereto; and means for re-transmitting said received vocoded signal received from the speaking participant to the other participants, wherein said means for re-transmitting includes:

switch means for selecting for re-transmission between first, second and third receivers adapted to receive signals transmitted by said first, second and third participant transmitters, respectively; and control means for activating said switch means in response to the output of said means for determining the rate of each vocoded signal.

9. A conference calling method for a wireless communications channel having first, second and third participants communicating via first, second and third transmitters and receivers respectively, wherein two of said participants are speaking and said conference calling method including the steps of:

receiving variable rate vocoded signals each having a rate from a plurality of transmitters;

determining the rate of each of said received vocoded signals;

selecting only one of said received vocoded signals based on the highest rate and based upon which participant was most recently speaking when it has been determined that a tie for the highest rate has occurred; and re-transmitting the selected received vocoded signal to the other participants.

* * * * *

UNITED STATES PATENT AND TRADEMARK OFFICE
CERTIFICATE OF CORRECTION

PATENT NO : 5,881,053
DATED : March 9, 1999
INVENTOR(S): Robert Kimball

It is certified that error appears in the above-identified patent and that said Letters Patent is hereby corrected as shown below:

On the title page: Item [54] and Column 1, line 3, change "Method for a Wireless Communications Channel" to --Conference Calling System and Method for a Wireless Communications Channel--.

Signed and Sealed this

Seventeenth Day of August, 1999

Attest:

Q. TODD DICKINSON

*Attesting Officer*  *Acting Commissioner of Patents and Trademarks*